R. P. WHITE.
TANK CAR FOR TRANSPORTING GRANULATED SUGAR IN BULK.
APPLICATION FILED JULY 13, 1910.
1,050,889.
Patented Jan. 21, 1913.
2 SHEETS—SHEET 1.
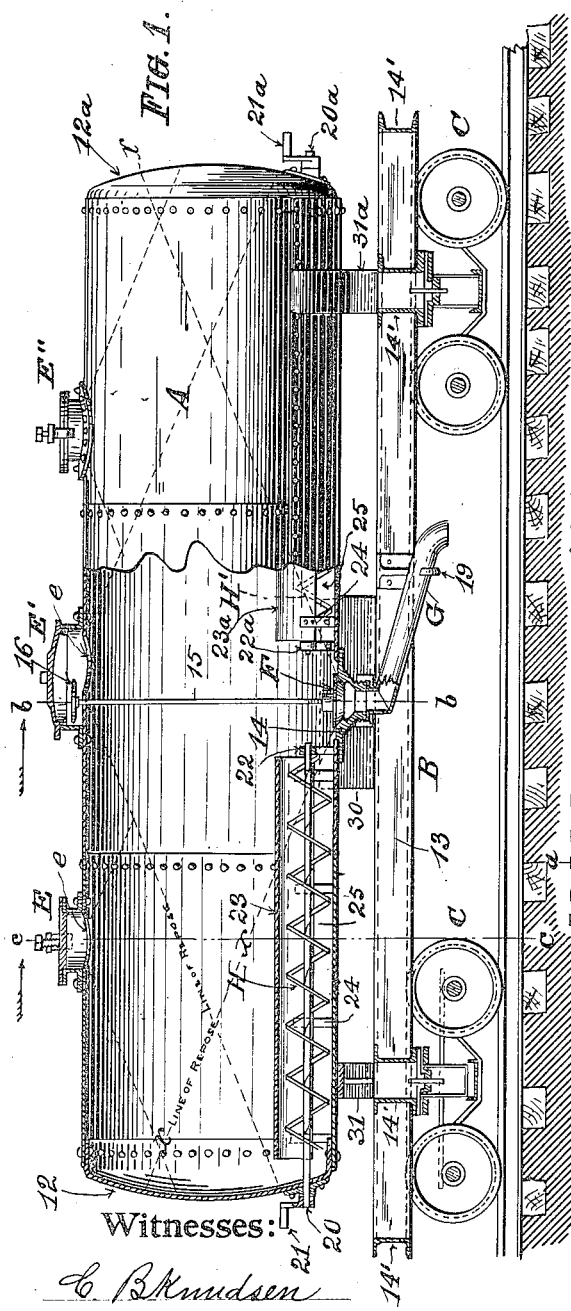
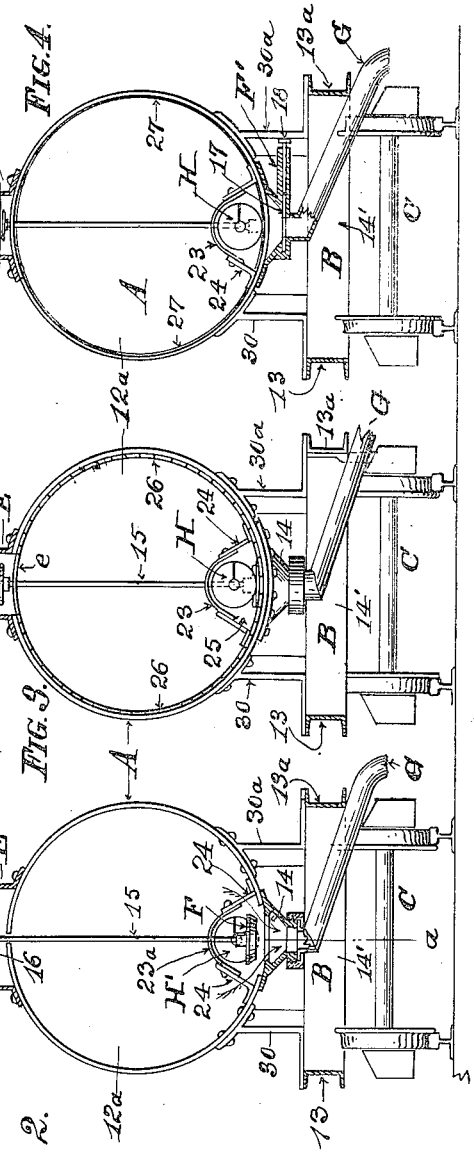
Witnesses:
C. B. Knudsen
A. G. Peterson
Inventor:
Richard P. White,
By Michael J. Stark & Sons,
Attorneys.

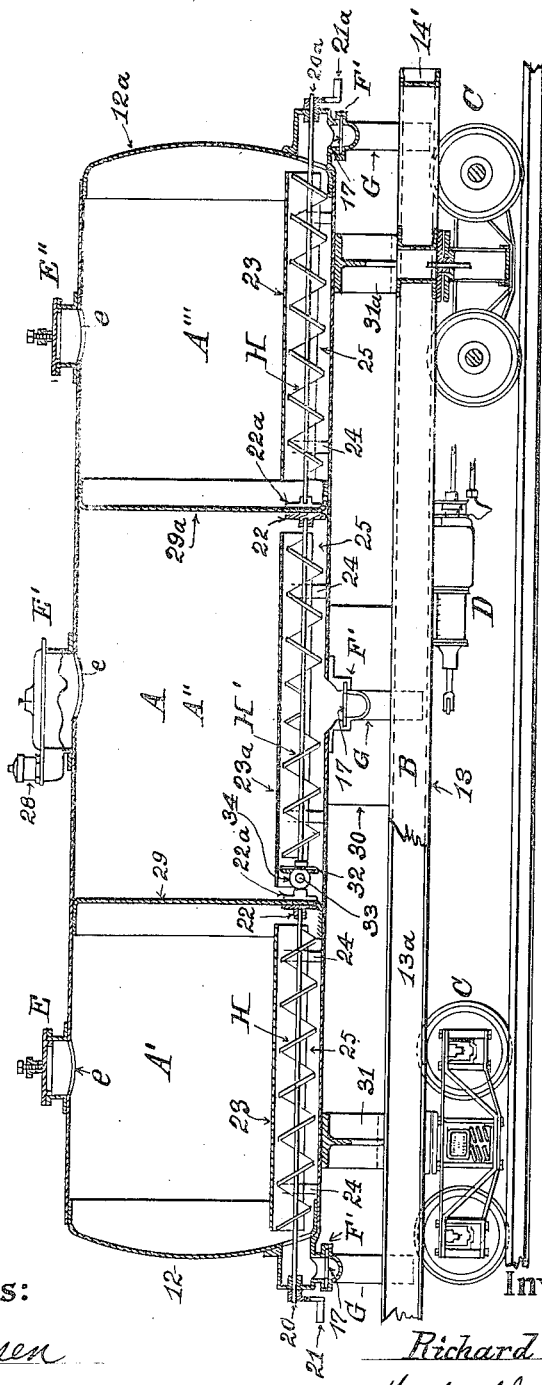

UNITED STATES PATENT OFFICE.

RICHARD P. WHITE, OF CHICAGO, ILLINOIS.

TANK-CAR FOR TRANSPORTING GRANULATED SUGAR IN BULK.

1,050,889.  Specification of Letters Patent.  Patented Jan. 21, 1913.

Application filed July 13, 1910. Serial No. 571,754.

*To all whom it may concern:*

Be it known that I, RICHARD P. WHITE, a citizen of the United States, and resident of Chicago, in the county of Cook and State of Illinois, have invented certain new and useful Improvements in Tank-Cars for Transporting Granulated Sugar in Bulk; and I do hereby declare that the following description of my said invention, taken in connection with the accompanying sheets of drawings, forms a full, clear, and exact specification, which will enable others skilled in the art to which it appertains to make and use the same.

This invention has general reference to railway and other tank cars adapted for transportation of granulated substances, such as sugar, salt, &c., in bulk; and it consists, essentially, in the novel and peculiar combination of parts and details of construction, as hereinafter first fully set forth and described, and then pointed out in the claims.

The object of this invention is the production of a preferably hermetically sealed, tank mounted upon a suitable structure to comprise what is technically known as a tank car, said car being especially adapted to transport granulated substances in bulk. These substances have been heretofore shipped in barrels and other containers, the cost of which, and the item of handling these containers at the shipping and receiving stations being considerable and adding materially to the selling price of said most necessary and extensively-used commodities. To avoid this heavy cost, or to reduce the same to a minimum, which is the object of this invention, I transport granulated sugar, salt and similar substances in bulk in large quantities, but to accomplish this object successfully, many difficulties have to be overcome. Granulated sugar, salt, and the like are hygroscopic and will imbibe moisture from the atmosphere, which is not permissible and, therefore, necessitates that in shipping the substances be well protected from moisture. These substances, furthermore, do not flow or move like water to a level surface, but gather to a hive, or cone, the sides of which, or their angle of repose, being approximately thirty degrees so that it is impossible to fill a closed tank entirely full without resorting to means to spread these granular substances. For this reason a tank will not entirely empty through a single discharge unless the portion of the substance beyond the angle of repose is moved toward the discharge opening by means other than gravity. To illustrate this condition of repose graphically, I have shown in Figure 1 a longitudinal sectional elevation of a tank car adapted to convey granulated substances in bulk, in which the angles of repose are indicated in dotted lines for both, the filling and the discharging of the tank, and which indicate how far a tank will fill with granulated substances by gravity, and how far from the discharge opening it will empty without mechanical means.

The tank of a tank car is generally about 30 feet, and in order to fill such a long tank, I provide the same with a number of filling openings, and in filling the same may use a flexible hose passed into the tank through the several filling openings to spread the substance, or I may provide mechanically operated spreaders to accomplish the desired object. To conduct that portion of the granular substance in the tank toward the discharge opening therein, which will not flow by gravity, I employ in the tank a conveyer, or a series of conveyers, comprising, preferably, a helical screw which may be operated by any suitable mechanical means so that, when rotating, the substance which will not flow automatically, may be moved mechanically toward the discharge opening.

In the drawings already mentioned, which serve to illustrate this invention fully, and form a part of this specification, Fig. 1, as already stated, is a longitudinal sectional elevation of a tank car suitable for conveying granulated substances in bulk, said figure being drawn in line *a a* of Fig. 2, part of the tank being shown in elevation. Fig. 2 is a transverse sectional elevation of the same in line *b b* of Fig. 1. Fig. 3 is a like view in line *c c* of Fig. 1. Fig. 4 is a like view illustrating a modified form of valve. Fig. 5 is a longitudinal sectional elevation of a tank car provided with a series of separate compartments.

A, in the drawings designates the tank of a railway tank car. It comprises, preferably, a cylindrical shell having ends 12, 12$^a$ of usual construction, said tank being mounted upon an underframe B, including longitudinal sills 13, 13$^a$, and a number of transverse, preferably channel, bars 14'. This subframe is carried upon car trucks C, of usual construction, said sub-frame being provided with all the necessary appliances, such as air-brake devices D, and the standard couplings, the latter devices not being shown in the drawings. This tank A is provided with a number of domes E, E', E", each of which has a cover that is adapted to be tightly closed, there being in said domes filling openings e through which access may be had to the interior of the tank by a person whenever necessary. In approximately the center of the tank A there is located in the lowermost part thereof, a valve F, of any approved design, the one shown in Figs. 1, 2, and 3, being of the circular-disk type having its periphery beveled and adapted to engage a similarly arranged seat 14, said valve controlling the discharge from said tank through a discharge spout G, while in Fig. 4 I have shown a sliding, or gate valve F', which may also be of any approved form, the valve F being operated by a lifting rod 15 having a hand wheel 16 to rotate the said rod 15, the gate 17 being operated by a rod 18.

The discharge spout is, preferably, swiveled to the valve F or F', so that while the car is in transit, said spout may be placed in longitudinal position relative to the sills of the car, as shown in Fig. 1, and be suitably supported in this position upon a hanger 19, but when the tank is to be emptied this spout, may be swung into transverse position, as illustrated in Figs. 2, 3, and 4. Or the spout may be removed entirely during transit and attached to the valve when the tank arrives at its place of destination and it is desired to empty the same.

As heretofore stated the angle of repose of granular substances is approximately 30 degrees, hence when discharging the tank, the substances at the end-portions of the tank below the lines of repose indicated by the letters $x$ $x$ of Fig. 1, will not run out of the tank by gravity. To empty these portions of the tank, I locate therein in the lowermost portion thereof, screw-conveyers H, H', the shafts 20, 20$^a$, of which pass through the ends 12, 12$^a$, of the tank and carry outside of the same cranks 21, 21$^a$, or any other suitable means by which the screw conveyers may be rotated, the inner ends of the conveyer shafts being journaled in bearings 22, 22$^a$, as indicated in Fig. 1. In order to relieve the screw conveyers from the weight of the superimposed layer of the granular substance, I cover these conveyers with approximately semi-circular guards 23, 23$^a$, said guards being supported by standards 24, and covering approximately the upper half of said conveyers, leaving sufficient spaces 25, at the sides of the conveyers to permit the granular substance to come within the range of the conveyers to be pushed toward the discharge spout G.

I have already mentioned the fact that granulated sugar, salt, and like substances are hygroscopic and will absorb moisture from the surrounding atmosphere, and in order to prevent this moisture from condensing upon the inner surfaces of the tank, I may cover the same with a non-conductor of heat, but I prefer, for sanitary and other reasons, to either line the tank with wood properly impregnated, as indicated at 26 in Fig. 3, or by a coating of enamel known by the commercial name of tank-enamel, applied to the inner surfaces of the tank, as illustrated at 27 in Fig. 4; and as a further precaution, I may exhaust the air from the tank after having been filled with the granular substance, by applying an air-exhauster, not shown, to the tank, connection being made with such an exhauster and the tank by applying a suction hose to the safety valve 28, usually located at the side of one of the domes, as shown in Fig. 5, said safety valve being provided to prevent an excess of pressure in the tank when subjected to the heat of the sun or other source of heat.

When the contents of the tank are more than required at any one place of delivery, I shall divide the tank into a number of compartments A', A", A'", as shown in Fig. 5, by placing bulk heads 29, 29$^a$, in the tank. In this case I shall provide each compartment with a screw-conveyer H, and with a separate discharge spout and separate filling opening, but if the brake-mechanism and other devices in the subframe, which are necessary on a railway car, interfere with the location of more than one spout underneath the tank in the space between the forward, and the rear truck, I shall locate the spouts for the end-compartments A' and A'" outside of the tank-ends 12, 12$^a$, as depicted in Fig. 5.

The tank A is preferably supported upon the subframe by means of a central attachment comprising side supports 30, 30$^a$, which are secured to the sills 13, 13$^a$, and to the tank A, saddles 31, 31$^a$, being provided at the ends of the tank to support the same freely so that expansion and contraction of the tank and the sub-frame under the varying heat-conditions will not affect the same. When the tank A is divided into several compartments, I shall place upon the intermediate conveyer-shaft a bevel wheel 32, and rotate the conveyer by a shaft 33, carrying a bevel pinion 34, engaging said bevel wheel, said shaft 33 passing through the shell and carrying means for rotating the same, in any desired manner, an electric motor and suitable belting or gearing, not shown, being one of the means that may be successfully employed.

I have heretofore also stated that the tank for carrying granular substances in bulk is mounted upon a sub-frame and trucks that are adapted to run upon the rails of a railway line, but it is evident that a tank of smaller capacity than that of a tank car may be mounted upon wheels adapted to run upon the streets and highways, by simply changing the running gear of the vehicle, the tank being otherwise supplied with all the heretofore-described features and elements which adapt this tank for use in transporting granulated substances in bulk.

I am aware that many of the details of construction shown in the drawings and described in this specification may be varied by a person skilled in the art to which this invention appertains without departing from the scope of my invention, which broadly speaking resides in the adaptation, construction, and combinations of elements whereby a tank car is adapted to transport granular substances in bulk over longer or shorter distances upon the railway lines now in use.

Having thus fully described this invention, I claim as new and desire to secure to myself by Letters Patent of the United States—

1. A tank car including a vessel having an outlet in its bottom, a conveyer in said vessel arranged adjacent said outlet and having a shaft that extends through a wall of said vessel and is provided with operating means located on the exterior of the wall, a guard for said conveyer of substantially semi-circular cross section overlying said conveyer and having its free side edges spaced from the vessel bottom to form long passages that communicate with the conveyer on each side thereof, and standards for supporting said guard having their lower ends secured to the vessel bottom and having their upper ends connected to the guard.

2. A tank car including a vessel provided with a pair of bulk heads dividing the car into three compartments, a conveyer in each compartment, the conveyers in the end compartments having the inner ends of their shafts journaled in the adjacent bulk heads and having their outer ends extending without the vessel ends and provided with operating means, the conveyer in the middle compartment having its ends journaled in the adjacent bulk heads and provided with a beveled gear wheel, a transverse shaft having a pinion meshing with said gear wheel and having its outer end extending through one of the sides of the vessel and provided with operating means, a guard overlying each conveyer and having its longitudinal side edges spaced from the vessel bottom to form a passage on each side of the conveyer, the ends of the guards being spaced from the adjacent walls of the compartments, and a discharge spout for each of the end compartments located on the outer walls thereof and exteriorly thereof, and communicating with the spaces between said outer walls and the adjacent ends of the guards.

In testimony that I claim the foregoing as my invention, I have hereunto set my hand in the presence of two subscribing witnesses.

RICHARD P. WHITE.

Witnesses:
MICHAEL J. STARK,
A. G. PETERSON.